United States Patent Office 3,757,009
Patented Sept. 4, 1973

3,757,009
SPIRO-[STEROID-17,2'-FURAN-3'-ONES] AND A PROCESS FOR THEIR MANUFACTURE
Georg Anner, Basel, Switzerland, assignor to Ciba-Geigy Corporation, Ardsley, N.Y.
No Drawing. Filed Mar. 2, 1971, Ser. No. 120,363
Claims priority, application Switzerland, Mar. 6, 1970, 3,287/70
Int. Cl. C07c 173/00
U.S. Cl. 260—239.55 R    3 Claims

ABSTRACT OF THE DISCLOSURE

Compounds of the formula

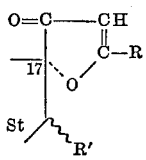

wherein
R=hydrogen, lower alkyl, aryl or aralkyl
R'=hydrogen, methyl, free or esterified hydroxyl or β-halogen
St=the residue of a substituted or unsubstituted, saturated or unsaturated steroid ring.

For example: 9α-fluoro-11β-hydroxy - 5',16α - dimethyl-spiro-[androst-1,4-diene-17α,2'-furane-3,3-dione].

Use: anti-inflammatory or gestagenic agents.

---

The subjects of the present invention are new spiro-[steroid-17,2'-furan-4'-ones] of partial formula

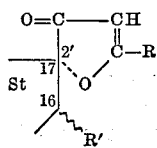

wherein R represents hydrogen, a saturated hydrocarbon radical, such as as an alkyl radical, preferably a lower alkyl radical, such as the methyl radical, or an aryl or aralkyl radical, such as an unsubstituted or substituted phenyl or phenyl-lower alkyl radical, it being possible for the aromatic nuclei to be substituted, for example by halogen atoms, trifluoromethyl groups, free esterified or etherified hydroxyl groups and/or lower alkyl groups, R' represents hydrogen, a methyl group in the α- or β-position or a free or esterified hydroxyl group in the α- or β-position or a halogen atom, such as a chlorine, bromine or fluorine atom in β-position, and St represents the radical of a substituted or unsubstituted, saturated or unsaturated, steroid ring.

This radical of a steroid ring can for example have double bonds in positions 1, 4, 5, 6 and/or 9 (11) or possess an aromatic ring A, and in particular have substituents, such as lower alkyl groups, for example methyl groups, free, esterified or etherified hydroxyl groups, free or ketalised oxo groups and/or halogen atoms, such as fluorine, bromine or chlorine atoms, in positions 3, 6, 9 and/or 11.

The compounds mentioned represent a new class of steroids and possess valuable pharmacological properties. Thus they possess, in particular, an anti-inflammation, gestagenic, anti-androgenic, oestrogenic and/or blood cholesterol-lowering activity. They can also serve as intermediate products for the manufacture of other pharmacologically active compounds.

Compounds to be particularly highlighted are those of formula

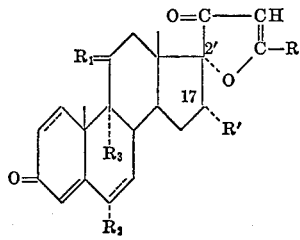

wherein R in particular represents hydrogen or a lower alkyl radical, such as methyl, ethyl or propyl, R' represents hydrogen or a methyl or hydroxyl group, $R_1$ denotes a free or esterified hydroxyl group in the β-position, together with a hydrogen atom, or an oxo group, and $R_2$ and $R_3$ denote hydrogen or a halogen atom, especially fluorine, and which can also possess further double bonds in the 1- and/or 6-position. These compounds are particularly active as anti-inflammation agents, as can be demonstrated in the foreign body granuloma test on rats, when the compound are administered systemically or locally.

Further compounds to be highlighted are those of formula

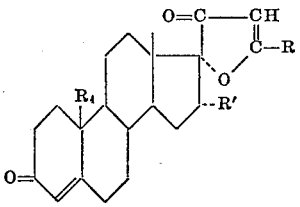

and their 3-ketals and 3-enol-ethers, wherein R' has the significance given above and $R_4$ represents a methyl group or a hydrogen atom and R in particular represents hydrogen or a lower alkyl radical, such as methyl, ethyl or propyl.

A further important group of new compounds corresponds to the formula

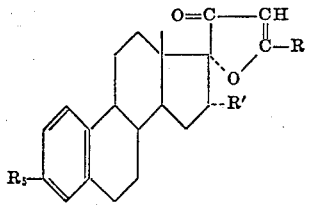

wherein R' has the significance given above, R in particular represents hydrogen or a lower alkyl radical, such as methyl, ethyl or propyl, and $R_5$ denotes a free, esterified or etherified hydroxyl group.

An esterified hydroxyl group is, in particular, a hydroxyl group which is esterified with a lower aliphatic carboxylic acid, such as acetic, propionic, butyric or caproic acid, an aromatic carboxylic acid, such as benzoic acid, or their derivatives which are substituted in the ring, for example by methoxy groups and/or halogen atoms, for example p-bromobenzoic acid or 3,4,5-trimethoxy-benzoic acid, or with an araliphatic carboxylic acid, such as an appropriate phenylacetic acid.

An etherified hydroxyl group is, in particular, a lower alkyloxy group, such as the methoxy or ethoxy group, a cycloalkyloxy group, such as the cyclopentyloxy group, an aryloxy group, such as the phenyloxy group, or their derivatives which are substituted by methoxy groups and/or halogen atoms in the ring, such as p-bromophenyloxy or p-chlorophenyloxy groups or an aralkyloxy group, such as the benzyloxy group or their derivatives which are substituted by methoxy groups and/or halogen atoms in the ring.

The new compounds are obtained if water is eliminated from a compound of partial Formula I

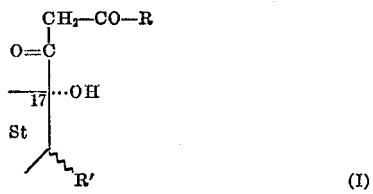

wherein R, R' and St have the abovementioned significance or a compound of the partial Formula II

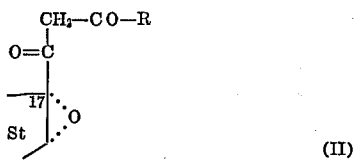

wherein R and St have the abovementioned significance, is treated with a strong acid, in particular a strong inorganic acid such as a hydrogenhalide, sulfuric acid or perchloric acid, and, if desired, a 3-oxo group is converted into a ketalised or enolised oxo group or a ketalised or enolised 3-oxo group is liberated.

The elimination of water can be effected by heating, for example to 150–250° C., especially by sublimation, primarily in a high vacuum or by heating in a high-boiling inert solvent, such as diphenylmethane. The elimination of water can however also be effected by treatment with an acid, for example a strong mineral acid, such as hydrochloric acid, or a sulphonic acid, such as methanesulphonic acid or p-toluenesulphonic acid, or also with Lewis acids, for example ferric chloride. This reaction is preferably carried out in a solvent, such as a lower alcohol, for example methanol or ethanol, a lower halogenated hydrocarbon, such as methylene chloride or their mixtures.

A 3-oxo group can be converted into a ketalised or enolised oxo group, or a ketalised or enolised oxo group converted into the free 3-oxo group, simultaneously with the elimination of water or also in a separate step. This reaction takes place in a manner which is in itself known.

The treatment of the compounds of the partial Formula II with a strong acid can be effected in an appropriate solvent, such as a lower aliphatic organic acid, e.g. acetic or propionic acid, a lower aliphatic alcohol, e.g. methanol, ethanol, propanol or tert. butanol. Preferably the strong acid, such as the halogen halides, e.g. hydrochloric, hydrobromic or hydriodic acid are used solved in acetic acid or the hydrofluoric acid in the presence of urea or dimethylformamide.

The starting substances used according to the invention can be obtained in accordance with our U.S. Pat. application Ser. No. 72,842 of Sept. 16, 1970, from the appropriate 21-S—CO-R compounds [21-acyl sulphides] by treatment with bases which are sufficiently strong to deprotonise the methylene group carrying the S, and optionally in the presence of a thiophilic compound. As bases, lower trialkylamines are especially used for this purpose, such as triethylamine, in the presence of lithium salts of strong inorganic acids, for example lithium perchlorate, and as a thiophilic compound organic derivatives of 3-valent phosphorus, such as triphenyl-phosphine, are especially used.

The starting substances of the partial Formula II may also be prepared by treating a corresponding compound non-substituted in 21-position according to Claisen, for example with an ester of an aliphatic carboxylic acid, such as acetic acid ethyl ester of formic acid ethyl ester in the presence of a strong base such as sodium hydride, amide or alcoholate.

The invention also relates to those embodiments of the process in which a starting substance is formed under the reaction conditions or is used in the form of one of its derivatives.

The new compounds can for example be used in the form of pharmaceutical preparations in which they are contained in the free form or, where appropriate, in the form of their salts, mixed with a pharmaceutical, organic or inorganic, solid or liquid excipient suitable for enteral, parenteral or topical administration. Possible substances, for forming the excipient are those which do not react with the new compounds, such as water, gelatine, lactose, starch, stearyl alcohol, magnesium stearate, talc, vegetable oils, benzyl alcohols, gum, propylene glycols, white petroleum jelly, cholesterol or other known medicinal excipients. The pharmaceutical preparations can for example be in the form of tablets, dragées, capsules, ointments or creams or in a liquid form as solutions, suspensions or emulsions. They are optionally sterilised and/or contain auxiliary substances, such as preservatives, stabilizers, wetting agents or emulsifiers, solubilising agents or salts for regulating the osmotic pressure or buffers. They can also contain other therapeutically valuable substances. The pharmaceutical preparations are formulated according to the usual methods.

The new compounds can also be used in veterinary medicine, for example in one of the abovementioned forms, or in the form of feedstuffs or additives to animal fodder. Herein the usual extenders and diluents or feedstuffs are for example used.

The examples which follow explain the invention without however restricting it in any way.

EXAMPLE 1

1 g. of 9α-fluoro-16α-mthyl-11β,17α-dihydroxy-21-acetyl-pregna-1,4-diene-3,20-dione is heated to about 200° C. in a high vacuum, in the course of which 9α-fluoro-11β - hydroxy - 5',16α - dimethyl - spiro-[androsta-1,4-diene-17α,2'-furane-3,3'-dione]sublimes. After crystallisation from methylene chloride-ether the melting point is 290–293° C. (with decomposition). The ferric chloride reaction is negative.

The same end product is obtained if 0.1 g. of the starting substance mentioned is dissolved in 3 ml. of methanol, 0.5 ml. of 5% strength aqueous ferric chloride solution is added, and the solvent is largely allowed to evaporate overnight at room temperature, whilst stirring. After addition of water the product is filtered off, washed with water and taken up in methylene chloride, and after washing with water and drying the solvent is evaporated in vacuo.

A strong acid can be used instead of the ferric chloride for the ring closure. If, for example, 0.1 g. of the starting substance mentioned are dissolved in 3 ml. of methanol, mixed with 0.5 ml. of 2 N hydrochloric acid and stirred overnight in accordance with the above data and worked-up, the desired end substance is again obtained.

If, in the above example, 6α,9α-difluoro-16α-methyl-11β,17α - dihydroxy - 21 - acetyl-pregna - 1,4-diene-3,20-dione is used as the starting substance, 6α,9α-difluoro-5', 16α - dimethyl - spiro - [androsta - 1,4 - diene - 17α,2'-furane 3,3'-dione] is obtained, which melts at 310° C., with decomposition, after crystallisation from methanol or methylene chloride-ether.

EXAMPLE 2

On sublimation in a high vacuum at about 160° C., 17α - hydroxy - 21 - acetyl - pregn - 4 - ene - 3,20-dione yields spiro-[androst - 4 - ene-17α,2'-furane-3,3'-dione], which melts at 171–173° C. after recrystallisation from methylene chloride-ether.

The cyclising elimination of water can also be effected by means of ferric chloride or a mineral acid, in accordance with the data in Example 1.

EXAMPLE 3

17α - hydroxy - 21 - acetyl - 20 - ketones, such as for example the starting substances given below, can be converted into the corresponding spiro-[androstane-17α,2'-furane-3,3'-dione] compounds in accordance with the data in Example 1:

| | |
|---|---|
| 9α-fluoro-16α-methyl-11β,17α-dihydroxy-21-acetyl-pregn-4-ene-3,20-dione. | 9α-fluoro-11β-hydroxy-5',16α-spiro-androst-4-ene-17α,2'-furane-3,3'-dione]. |
| 6α,9α-difluoro-16α-methyl-11β,17α-dihydroxy-21-acetyl-pregn-4-ene-3,20-dione. | 6α,9α-difluoro-11β-hydroxy-5',16α-dimethyl-spiro-androst-4-ene-17α,2'-furane-3,3'-dione]. |
| 3-methoxy-17α-hydroxy-21-acetyl-pregna-1,3,5(10)-trien-20-one. | 3-methoxy-spiro-oestra-1,3,5(10)-triene-17α,2'-furan-3'-one]. |
| 17α-hydroxy-21-acetyl-19-norpregn-4-ene-3,20-dione. | Spiro-oestr-4-ene-17α,2'-furane-3,3'-dione]. |
| 9α-fluoro-16α-methyl-17α-hydroxy-21-acetyl-pregna-1,4-diene-3,11,20-trione. | 9α-fluoro-5',16α-dimethyl-spiro-androsta-1,4-diene-17α,2'-furane-3,3'11-trione]. |

EXAMPLE 4

1 g. of 17α - hydroxy-21-acetyl-pregn-4-ene-3,20-dione is suspended in 100 ml. of benzeen and 6 ml. of ethylene glycol. After adding 25 mg. of p-toluenesulphonic acid monohydrate the mixture is boiled under reflux whilst stirring and the water formed is separated off using a water separator. After 4 hours the mixture is cooled to 10° C., 20 ml. of saturated sodium bicarbonate solution are added, the whole is well mixed, and the benzene solution separated off and twice washed with water. Thereafter the solvent is dried and evaporated in vacuo. The crystalline residue is mixed with 0.1 ml. of pyridine and recrystallised from methylene chloride-ether. 3,3-Ethylenedioxy - spiro - [androst - 5 - ene-17α,2'-furan-3'-one] is obtained. Melting point=222–231° C.

On splitting the 3-ketal with p-toluenesulphonic acid monohydrate in acetone, the spiro-[androst-4-ene-17α,2'-furane-3,3'-dione] described in Example 2 is obtained.

9α - fluoro - 16α - methyl-11β,17α-dihydroxy-21-acetyl-pregn-4-ene-3,20-dione can be converted analogously into 3,3 - ethylenedioxy - 9α - fluoro - 11β-hydroxy-5',16α-dimethylspiro-[androst-5-ene-17α,2'-furan-3'-one].

The starting substances used in the preceding examples can for example be obtained in the following manner:

EXAMPLE 5

100 ml. of benzene are poured over a mixture of 4.5 g. of 9α - fluoro - 16α-methyl-11β,17α-dihydroxy-21-mercapto-pregna-1,4-diene-3,20-dione-21-S-acetate, 6.55 g. of triphenylphosphine, 2.76 g. of lithium perchlorate (anhydrous) and 10.7 ml. of triethylamine. A stream of nitrogen is passed over the suspension. After 71 hours' stirring at 24° C. the solvent which has partly been entrained by the nitrogen is replaced, the mixture is stirred for a further ½ hour and filtered, and the filter residue is washed with 100 ml. of benzene. Evaporation of the benzene solution yields a mixture of triphenylphosphine and triphenylphospine-sulphide, which is discarded. The filter residue is introduced into a separating funnel together with 50 ml. of 2 N hydrochloric acid and 150 ml. of ice/water and extracted with methylene chloride. The methylene chloride extract is again washed with hydrochloric acid and subsequently with water. After evaporation of the methylene chloride solution in vacuo at about 35° C., a crystalline residue is obtained which according to examination by thin layer chromatography does not contain any starting material. Ferric cloride reaction: red-brown. The residue is now stirred with 30 ml. of methylene chloride and filtered off. The colourless crystal powder is easily soluble in methanol. For recrystallisation, it is dissolved in a little methanol, a large amount of methylene chloride is added and the mixture concentrated by evaporation, with displacement of the methanol until crystallisation occurs. The 9α-fluoro-16α-methyl-11β,17α-dihydroxy - 21 - acetyl - pregna-1,4-diene-3,20-dione thus obtained contains 1 mol of methylene chloride of crystallisation, and melts at 159–161° C., with evolution of methylene chloride.

The desulphurisation can also be effected in dimethylformamide, for example at 70° C.

6α,9α-difluoro-16α-methyl-11β,17α - dihydroxy-21-mercapto-pregna-1,4-diene-3,20-dione-21-S-acetate can be converted into 6α,9α-difluoro-16α-methyl-11β,17α-dihydroxy-21-acetyl-pregna-1,4-diene-3,20-dione (ferric chloride reaction: wine-red) analogously to the above data.

Starting from the following 21-acyl sulphides, the starting substances used above can be obtained analogously:

| 21-acyl sulphides | Starting substances |
|---|---|
| 17α-hydroxy-21-mercapto-pregn-4-ene-3,20-dione-21-S-acetate. | 17α-hydroxy-21-acetyl-pregn-4-ene-3,20-dione. |
| 9α-fluoro-16α-methyl-11β,17α-dihydroxy-21-mercapto-pregn-4-ene-3,20-dione-21-S-acetate. | 9α-fluoro-16α-methyl-11β,17α-dihydroxy-21-acetyl-pregn-4-ene-3,20-dione. |
| 6α,9α-difluoro-16α-methyl-11β,17α-dihydroxy-21-mercapto-pregn-4-ene-3,20-dione-21-S-acetate. | 6α,9α-difluoro-16α-methyl-11β,17α-dihydroxy-21-acetyl-pregn-4-ene-3,20-dione. |
| 3-methoxy-17α-hydroxy-21-mercapto-pregna-1,3,5-(10)trien-20-one-21-S-acetate. | 3-methoxy-17α-hydroxy-21-acetyl-pregna-1,3,5(10)-trien-20-one. |
| 17α-hydroxy-21-mercapto-19-nor-pregn-4-ene-3,20-dione-21-S-acetate. | 17α-hydroxy-21-acetyl-19-nor-pregn-4-ene-3,20-dione. |
| 9α-fluoro-16α-methyl-17α-hydroxy-21-mercapto-pregna-1,4-diene-3,11,20-trione-21-S-acetate. | 9α-fluoro-16α-methyl-17α-hydroxy-21-acetyl-pregna-1,4-diene-3,11,20-trione. |

EXAMPLE 6

4 g. of 3β-hydroxy-16α,17α-oxido-21-formyl-Δ⁵-pregnen-20-on are mixed while stirring with 40 ml. of acetic acid, cooled to 12 to 13° C. and dropwise a solution of hydrobromic acid in acetic acid (1 part of volume hydrobromic acid of 30%, 2 parts of volume glacial acetic acid) added. After one hour the reaction mixture is poured over a solution of 40 g. of sodium acetate in 400 ml. of water and the crystalline precipitate filtered off. After washing with water, the residue is dissolved in methylene-chloride, the solution washed twice with water, then dried and evaporated in vacuo. The spiro-[3β-hydroxy-16β-bromo-androst-4-en-17α,2'-furan-3'-on] thus obtained is recrystallized from methylene chloride. Melting point 157–158° (decomp.).

1.8 g. of the crude spiro-[3β-hydroxy-16β-bromo-androst-4-en-16α,2'-furan-3'-on] are dissolved in 35 ml. of pyridine and 17.5 ml. of acetic acid anhydride and stirred under nitrogen at room temperature for 12 hours. The brownish colored reaction mixture is dropped while stiring into a mixture of 90 ml. of water and 30 g. of ice. The crystalline precipitate is filtered off, washed with water and then dissolved in methylene chloride. The solution obtained is washed with 2-n hydrochloric acid and water, dried and evaporated under vacuum. The thus obtained spiro-[3β-acetoxy-16β - brom-androst-5-en-17α,2'-furan-3'-on] melts after crystallization from methylene-chloride-acetone at 263–267° C.

Starting from the corresponding 21-formyl-compounds, the following compounds are obtained analogously:

| | |
|---|---|
| 3-methoxy-16α,17α-oxido-21-formyl-19-nor-pregna-1,3,5(10)-trien-20-on. | Spiro-[3-methoxy-16β-bromo-pregna-1,3,5(10)-trien-17α,2'-furan-3'-on]. |
| 3β,11α-dihydroxy-16α,17α-oxido-21-formyl-5α-pregnan-20-on. | Spiro-[3β,11α-dihydroxy-16β-bromo-5α-pregnane-17α,2'-furan-3'-on]. |

The compounds used as starting material in this example may be obtained as follows:

To a mixture of 32 ml. of formic acid ethyl ester and 170 ml. of benzene there is added while cooling with ice and stirring under nitrogen, 12.8 g. of sodium methylate. After half an hour 13.2 g. of 3β-hydroxy-16α,17α-oxido-Δ⁵-pregnan-20-on are added. The reaction mixture is stirred 16 hours at 0°–5° C. and then poured on a mixture of 100 ml. of water, 100 g. of ice and 14 ml. of glacial acetic acid. The benzene layer is separated, washed neutral with water, dried and evaporated under vacuo. The residue obtained as brownish colored foam is the 3β-hydroxy-16α,17α - oxido-21-formyl-Δ⁵-pregnen-20-on, which shows the expected UV-adsorption at 280 mμ. It may be sued for the following step with purification.

In a manner analogous to that described before there may be obtained from the 3-methoxy-16α,17α-oxido-19-norpregna-1,3,5(10)-trien-20-on and the 3β,11α-dihydroxy-16α,17α-oxido-5α-pregnan-20-on the corresponding 21-formyl compounds.

I claim:

1. A spiro-steroid of the formula

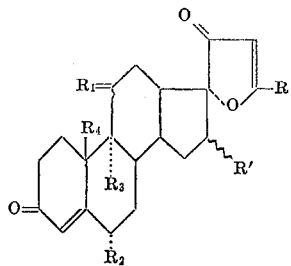

wherein $R_1$ is (1) a free or esterified hydroxyl group in the β-position together with a hydrogen atom or (2) an oxo group, $R_2$ and $R_3$ are each hydrogen or halogen, at least one of $R_2$ and $R_3$ being halogen, $R_4$ is hydrogen or methyl, R is hydrogen, lower alkyl, phenyl, phenyl-lower alkyl or phenyl-lower akyl substituted on the phenyl ring by halogen, trifluoromethyl, hydroxyl, esterified hydroxyl, etherified hydroxyl or lower alkyl, and R' is hydrogen, methyl, hydroxyl, esterified hydroxyl or halogen in the β-position, each of said esterified hydroxyl groups being derived from a lower aliphatic carboxylic acid, benzoic acid, benzoic acid ring-substituted by methoxy or halogen or phenyl-acetic acid, and each of said etherified hydroxyl groups being derived from a lower alkanol, a cycloalkanol, phenol, methoxy-substituted phenol and halo-substituted phenol.

2. A compound as claimed in claim 1, wherein R stands for methyl, R' is hydrogen, $R_1$ represents a β-positioned hydroxy group together with a hydrogen atom or an oxo group, $R_2$ stands for hydrogen or a fluorine atom and $R_3$ represents a fluorine atom.

3. Compounds as claimed in claim 1, having the formula

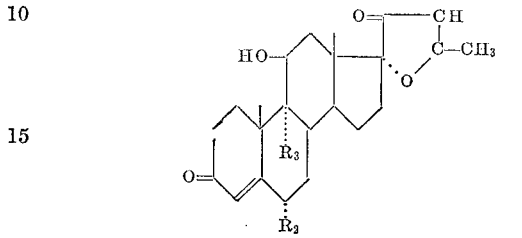

wherein $R_2$ represents hydrogen or a fluorine atom and $R_3$ stands for a fluorine atom.

References Cited

UNITED STATES PATENTS

| | | | |
|---|---|---|---|
| 3,158,620 | 11/1964 | Brown et al. | 260—239.55 |
| 3,205,243 | 9/1965 | Riano et al. | 260—397.4 |
| 3,424,750 | 1/1969 | Fried | 260—239.55 |
| 3,420,820 | 1/1969 | Stache et al. | 260—239.57 |
| 3,547,912 | 12/1970 | Lefebvre | 260—239.55 |

HENRY A. FRENCH, Primary Examiner

U.S. Cl. X.R.

260—999